United States Patent [19]

Le Van

[11] 4,131,970
[45] Jan. 2, 1979

[54] QUICK-RELEASE-HINGE DEVICE

[76] Inventor: Eugene B. Le Van, 15858 El Paseo Dr., Whittier, Calif. 90603

[21] Appl. No.: 860,751

[22] Filed: Dec. 15, 1977

[51] Int. Cl.² .......................................... E05D 15/50
[52] U.S. Cl. ....................................... 16/147; 49/383; 49/141; 49/465; 98/2.14; 296/137 B
[58] Field of Search ............... 49/465, 397, 381, 383, 49/141; 16/147, 171, 174; 292/197, 257; 296/137 B; 98/2.14

[56] References Cited

U.S. PATENT DOCUMENTS

| 2,349,486 | 5/1944 | Crosman | 16/147 |
| 3,262,227 | 7/1966 | Pentecost | 16/147 X |
| 3,861,083 | 1/1975 | Goiot | 49/465 X |
| 3,974,753 | 8/1976 | Blomgren | 296/137 B |
| 4,021,073 | 5/1977 | Manning | 49/141 X |

Primary Examiner—Kenneth Downey

[57] ABSTRACT

A quick-release-hinge device comprising an elongated, latching, tongue member being releasably mounted to a stationary mounting bolt secured along one edge of a removable cover member, the cover member being formed to close an opening in a structure wherein the opening is defined by a peripheral frame member which includes a jaw member arranged to releasably receive the hinged, latching, tongue member, and a peripherally mounted sealing member disposed to be positioned between the frame member and the cover member in order to sealingly engage the peripheral edge of the cover in a closed mode. The elongated tongue is releasably held in a substantially fixed relationship to the cover member by a hold-down handle when the cover is closed or pivoted about the jaw member. When the cover member is to be removed from the frame structure, the hold-down handle is disengaged from the tongue member, allowing the tongue to float freely and to separate from the cover — thus permitting the tongue member to have space for disconnecting from the jaw member, and thereby releasing the cover from the frame structure.

13 Claims, 17 Drawing Figures

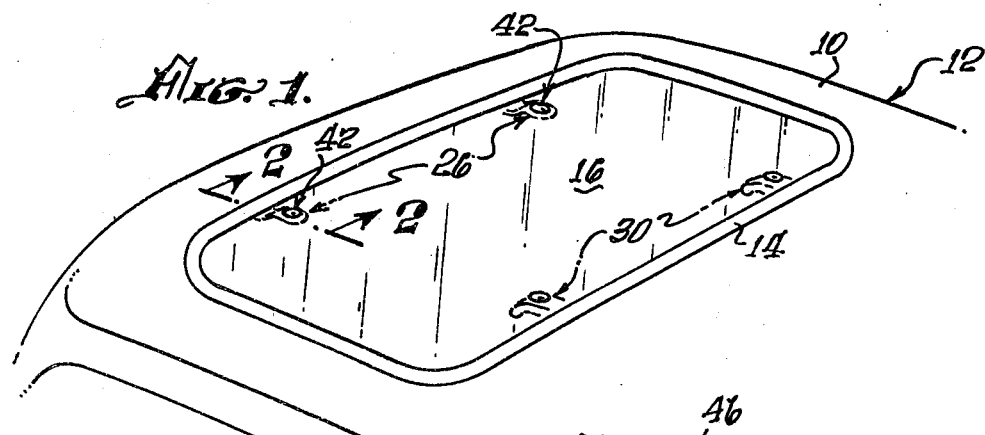
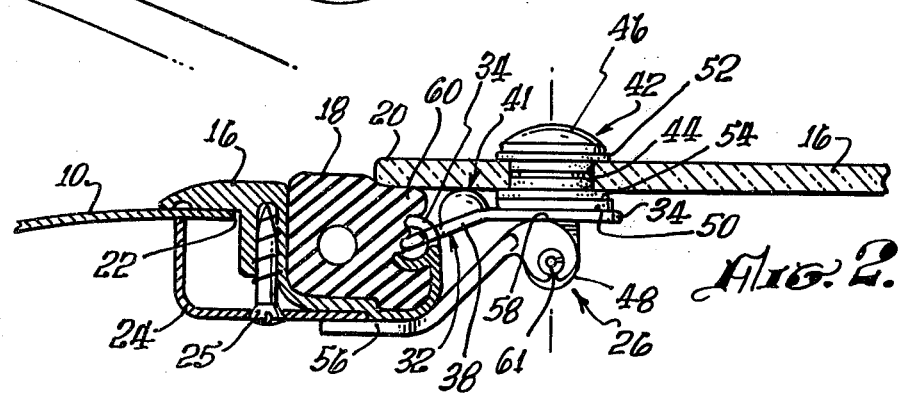
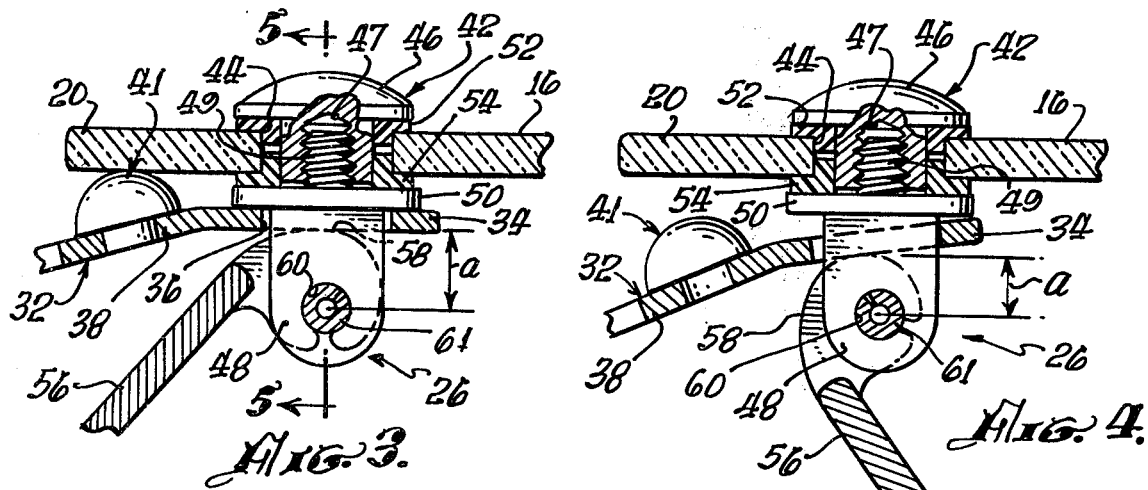
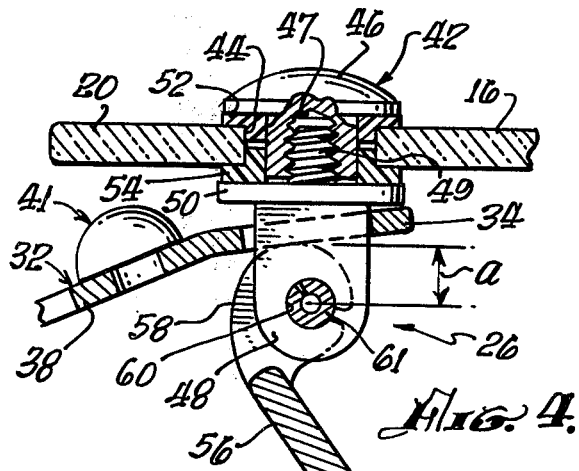
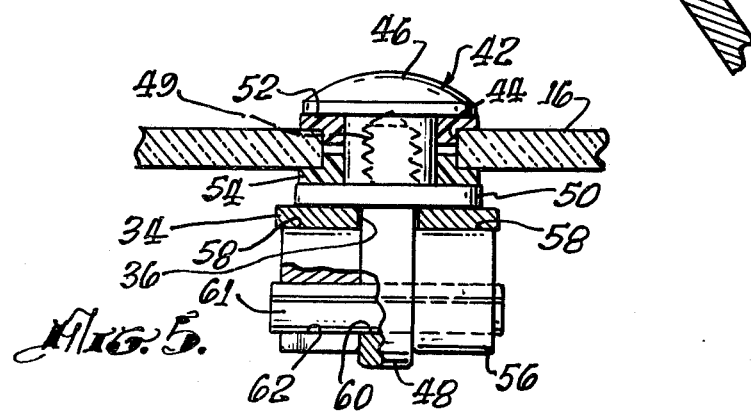

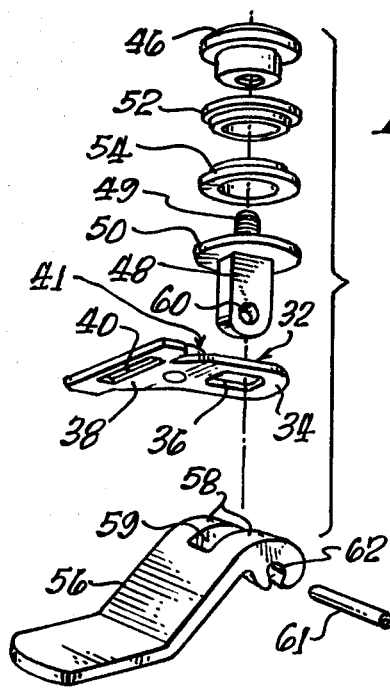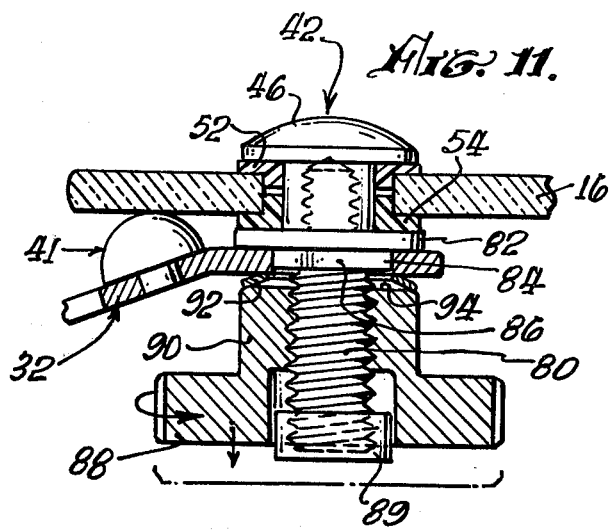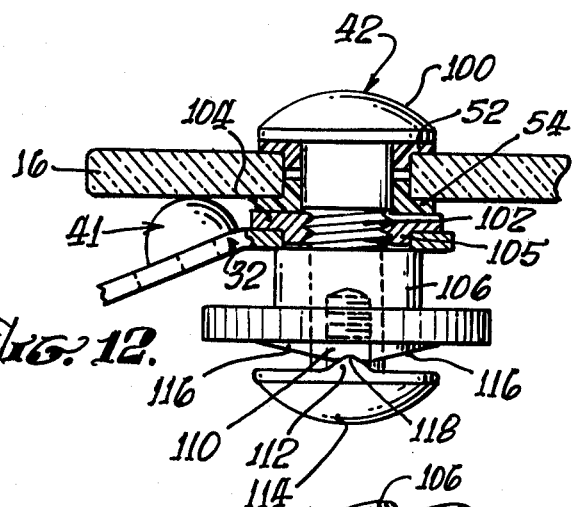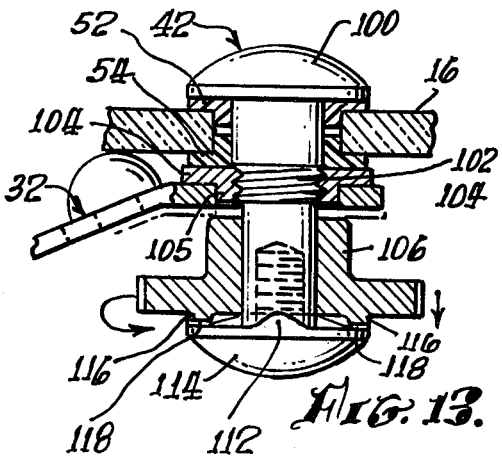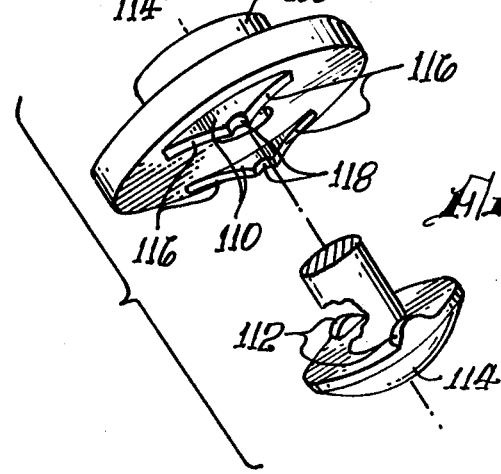

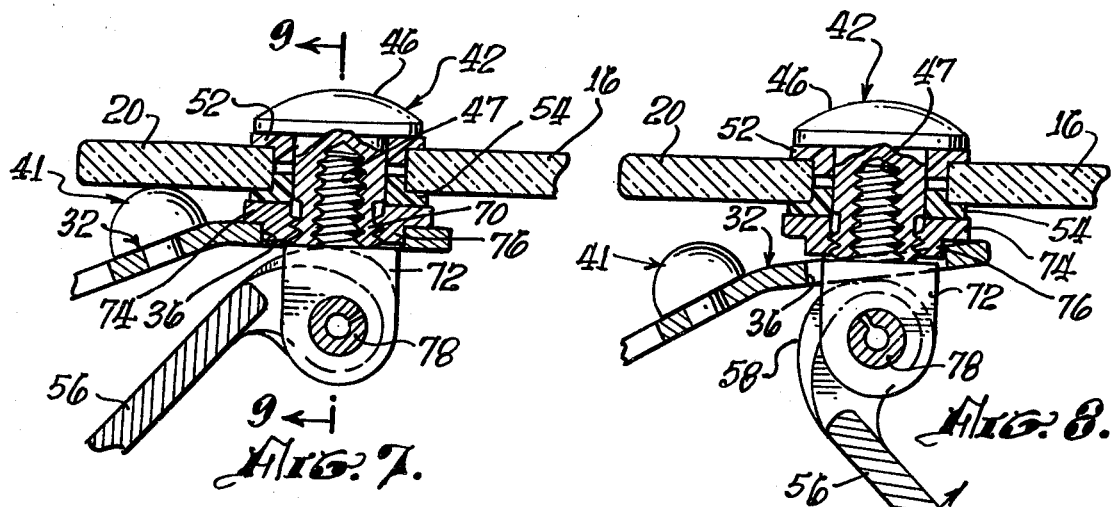
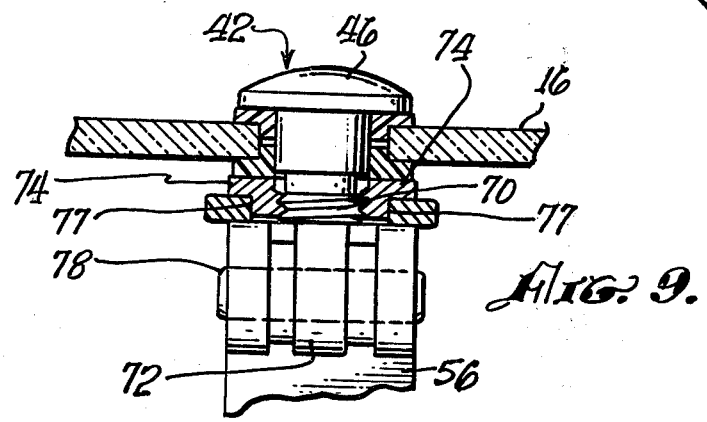
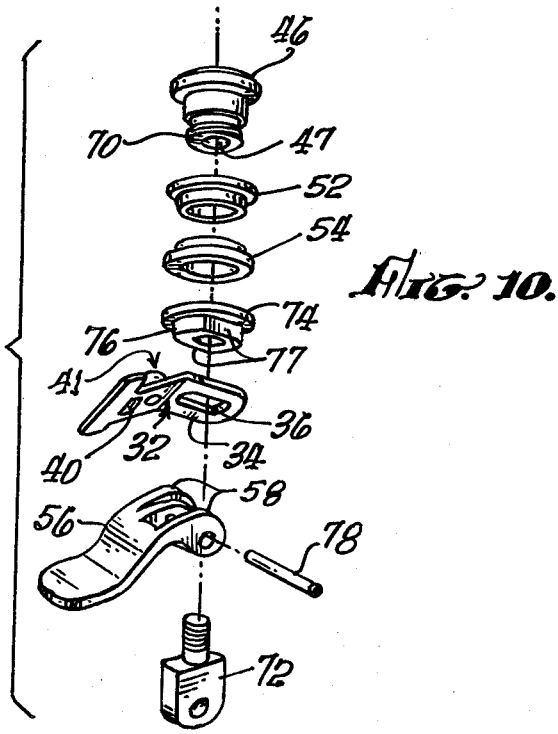

QUICK-RELEASE-HINGE DEVICE

BACKGROUND OF THE INVENTION

1. Field of the Invention

This invention relates generally to a hinge mechanism and, more particularly, to a quick-release-hinge device to allow a fast and simple means for removing a hinged cover or partition.

2. Description of the Prior Art

As is well known in the art, various problems and difficulties are encountered in providing suitable means for releasably hinging covers, partitions, panels, and like closure members — especially where a closure member is hinged to a frame structure having a peripheral seal positioned to engage the peripheral edge of the closure member.

Several types of disconnecting hinges are used in the various fields. One particular field or industry having problems associated with removable hinges is in automobile roof vents (also known as sun roofs); and these require that the closure panels or covers not only be hinged so as to open at various degrees, but they must also be completely sealed from the elements. A still further requirement is that these covers be easily and simply removable from the vent-frame structure, whereby an individual can, without any relative difficulty, disconnect and release the closure panel — and then afterwards reconnect the hinge members, thus permitting the closure to again be hinged to the frame structure.

Another problem found with the disconnecting-hinge devices used at the present time is that they are located or mounted to the exterior surfaces of the panel-and-frame structure. Thus, they are exposed and are easily tampered with; and, further, they do not present designs having overall eye appeal.

SUMMARY OF THE INVENTION

The present invention comprises a quick-release-hinge device wherein an elongated latching tongue is mounted to a closure member, such as a panel, partition or cover. In this particular arrangement, the hinge device is designed to be associated with automobile-roof-vent units — otherwise referred to as sun roofs.

Thus, the tongue member is mounted to the underside of a closure panel or cover (generally a glass partition), with the opposite mating part of the hinge being formed in a frame structure defined by a connecting jaw member adapted to receive the tongue member — in order to allow it to pivot within the jaw member. The latching tongue is held in a substantially stationary position relative to the panel by a releasable handle which can either be in the form of a cam-latching arm or a rotatable-engaging keeper, wherein both are movably mounted to the panel by a bolt having a depending lug member.

When the panel is used as a controlled vent opening, the tongue member is fixedly held in place by the latching arm or keeper, thereby allowing the tongue to move and rotate about the axis of the stationary jaw member.

However, when the closure panel is to be completely removed from the vent-frame structure, the latching arm or keeper is disengaged from the tongue member, allowing it to freely move on the bolt lug and thus permitting the panel to move substantially away from the frame structure prior to the removal of the latching tongue from the mating jaw member.

It should be noted that the frame structure includes a peripheral sealing device which would in fact prevent removal of the panel when the tongue member is substantiallly affixed thereto in a permanent manner, as is now found in this type of hinge. That is, when the panel is hinged upwardly, the rearward panel edge is forced downwardly into the sealing material — thus forcing it against the hinging device and preventing the two hinge sections from being separated from each other. Thus, the present device prevents the panel from forceably engaging the sealing member, allowing the latching tongue to be readily removed from the connecting jaw member.

Accordingly, the latching tongue can be readily connected to the jaw member when it is not rigidly secured to the closure panel. Once the latching tongue is in place, it is again latched into a stationary relationship with the panel, wherein the panel again is hingedly connected to the frame structure.

OBJECTS AND ADVANTAGES OF THE INVENTION

The present invention has for an important object a provision to allow a quick-release or separation of a hinged-closure member, such as a panel or cover, from a fixedly-mounted-frame structure — particularly the glass-panel type associated with sun-roof devices that are mounted in the roofs of automobiles.

It is another object of the invention to provide a quick-release hinge device wherein one hinge section comprises an elongated tongue member that is releasable from a fixed position to a free-floating mode, thus allowing a degree of separation between the tongue and its related panel so as to become freely disconnected from the stationary hinge member formed on the frame structure.

It is still another object of the invention to provide a quick release hinge device that is designed to be attached and mounted to the interior area of the panel-and-frame structure — thus shielding it so that it is not exposed to possible damage or interruption of the exterior contour of the automobile.

It is a further object of the invention to provide a device of this character that is capable of being operated by any individual without the need of assistance from others or of special tools.

It is still a further object of the invention to provide a device of this character that is relatively inexpensive to manufacture, yet simple and rugged in construction in order to withstand adverse weather conditions and mishandling.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a pictorial view of a hinged glass panel and its associated frame structure mounted in the roof of a vehicle;

FIG. 2 is an enlarged, cross-sectional view taken substantially along line 2—2 of FIG. 1, showing the preferred embodiment of the invention wherein the locking arm is in a locked mode, thus holding the hinged tongue in a fixed position;

FIG. 3 is an enlarged, cross-sectional view, showing further details of the construction of the releasable-tongue member;

FIG. 4 is a further cross-sectional view thereof, illustrating the latching arm in a released position, thus allowing the tongue member to float freely on the mounting lug;

FIG. 5 is a cross-sectional view taken substantially along line 5—5 of FIG. 3.

FIG. 6 is an exploded, perspective view of the preferred embodiment

FIG. 7 is a cross-sectional view of an alternative arrangement of the quick-release-hinge device shown in a latched position;

FIG. 8 is a similar cross-sectional view thereof, with the device shown in a released position;

FIG. 9 is a cross-sectional view taken along line 9—9 of FIG. 7;

FIG. 10 is an exploded view thereof;

FIG. 11 is a sectional view of another arrangement of the device wherein the locking-arm member is a threaded handle;

FIG. 12 is still a further embodiment having a cam-surfaced, rotatable handle shown in a locked mode;

FIG. 13 is a sectional view thereof showing the device in a released position;

FIG. 14 is a perspective of the camed handle and its associated cam-head member.

DESCRIPTION OF THE PREFERRED EMBODIMENT

Figure 15:
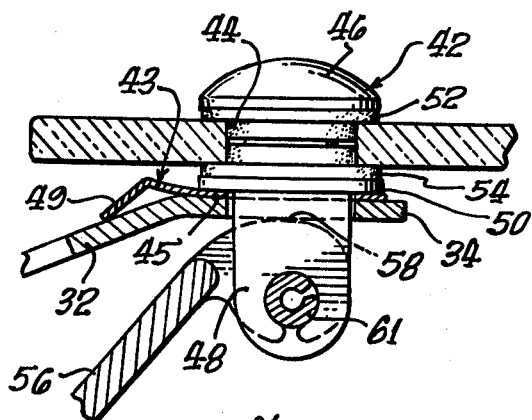
FIG. 15 is a sectional view similar to FIG. 3, wherein the stop means is shown as a leaf-spring member.

Referring more particularly to FIG. 1, there is shown a roof portion 10 of a vehicle, generally indicated at 12, having a frame structure 14 mounted (in an opening disposed in roof 10) in the well-known manner, as seen in FIG. 2. The frame structure and its associated glass panel 16 is generally referred to in the art as a "sun roof".

However, it should be understood that the present invention may be employed wherever a closure member, such as 16, is required to be hinged — and further to be released and separated from the frame structure.

Accordingly, the sun-roof apparatus comprises a frame structure 14 of extruded aluminum having a generally rectangular configuration, and includes a resilient rubber molding 18 extending around the perimeter of frame 14 so as to sealingly engage panel 16 along its peripheral edge 20. In this illustration, frame 16 is shown affixed in opening or aperture 22 by means of a frame collar 24 and fastening means such as screws 24.

Panel 16 is shown being releasably attached to frame structure 16 by a quick-release-hinge device, generally indicated at 26. As seen in FIG. 1, a pair of hinge devices is mounted along the pivoting forward edge of panel 16; while the opposite edge — referred to as the trailing or rearward edge — of the panel is provided with a pair of latch mechanisms, designated at 30. Since various types of latch mechanisms can be used with the hinge device 26, the latch mechanisms are not shown in detail as they are not part of the present invention.

The quick-release-hinge device comprises suitable hinge members — one being a hinged tongue member defined by an elongated plate 32, and the other being hinge member 34 carried by frame structure 16. Hinge member 34 is integrally formed in frame 16 and defined as a receiving jaw member adapted to operably receive tongue member 32 therein. Tongue member 32 is formed from an elongated flat plat having its extended, hinge-connecting, forward end bent downwardly at a slight inclination. That is, the rear portion 34 of the tongue member is mounted to the panel member 16, the forward portion thereof extending rearwardly and downwardly so as to be substantially spaced from the rear edge of panel 16. This then allows the peripheral edge of the panel to engage sealing member 18 in a positive manner, as seen in FIG. 2. The flat portion of tongue 34 is provided with an elongated aperture 36 (seen in FIG. 6) while the forward bent portion 38 includes a transversely arranged slot 40 wherein a portion of jaw 34 is received therein, the jaw 34 being formed in a somewhat "C" shaped configuration. Also secured to tongue 32 is a stop means, designated at 41, which is defined as a resilient bumper member that is arranged to engage the underside of panel 20.

Tongue 32 is mounted to panel 16 by a fastener means, generally indicated at 42, which is supported in hole 44 disposed in panel 16. The fastener means shown herein comprises a nut-head member 46 having a threaded bore 47 in which is received the threaded end 49 of a connecting means defining an eyelet-lug member 48, the eyelet lug arranged to depend downwardly on the underside of panel 16. Included as an integral part of lug 48 is ring member 50 disposed adjacent the threaded end 49. Interposed between nut heat 46 and ring member (defined as flange) 50 is a pair of washers 52 and 54, the washers being preferably of a plastic (nylon) having an annular-sleeve member which projects into opening 44 of panel 16, thereby protecting and preventing metal contact with the panel when glass is used.

Eyelet lug 48 is formed having oppositely disposed flat sides so as to accept the elongated aperture 36 of tongue 34. Thus, tongue 34 cannot rotate about lug 48 — it must remain projecting rearwardly at all times. However, the length of aperture 36 is slightly longer than the width of lug 48, in order to allow for the play or movement of tongue 32 when not locked in a stationary mode. (See FIG. 4.)

Movably connected to lug 48 is a clamp means, which in this embodiment comprises a clamp arm 56 having a cam-head member 58, the cam head being slotted in order to define a yoke 59 in which is received eyelet lug 48 positioned between opposite cam-head sections, whereby a pin 61 is placed in and through aligned holes 60 and 62 of lug 48 and cam-head sections 58, respectively.

In FIGS. 2 and 3, the latching arm 56 is shown in a latched locking mode; i. e., the arm 56 is positioned upwardly against the underside of frame 16 wherein arm 56 is bent to fit so as to be as flush as possible — thus preventing it from being accidentally unlatched. When arm 56 is latched as stated, cam head 58 engages the underside of latching tongue 32 at section 34, thus clamping the tongue against flange 50 and locking tongue 53 in a substantially fixed position relative to panel 16, at which time resilient bumper 41 is forced into engagement with panel 16.

Once the tongue is connected to jaw 34 and locked in a stationary mode, panel 16 can then be hingedly rotated when latched mechanisms 30 are released. As panel 16 is rotated through hinge members 32 and 34, the forward edge of panel 16 engages seal 18 and compresses the leading edge 60 thereof, thus preventing tongue 32 from being disengaged from jaw 34.

Hence, tongue 32 must be able to float freely from panel 16, so as to permit panel 16 to lift away from sealing edge 60 and allow tongue 32 to separate from jaw-hinge member 34. In FIG. 4, tongue 32 is shown separated from a stationary mode, whereby clamp arm has been lowered so as to disengage the cam head 58 from the flat section 34 of tongue 32. Thus, the tongue is allowed to be moved or float freely from the panel. As can be seen in FIGS. 3 and 4, the distance "a" between the center of pin 61 and the cam head is greater in a locked position than in an unlocked position (shown in FIG. 4).

However, there is a need to prevent the tongue 32 — when in a free mode — from moving upwardly against the peripheral edge 20 of panel 16. Hence, as the panel is to be again hingedly connected, each tongue member must be spaced at such an angle as seen in FIGS. 2 and 3. If tongue 32 is allowed to freely move upwardly past that point, it cannot be engaged with the jaw member 34. Thus, stop means 41 will abut panel 16 — allowing the slotted forward end portion 30 to be forced under sealing edge 60 and hooked over jaw 34.

Figure 16:
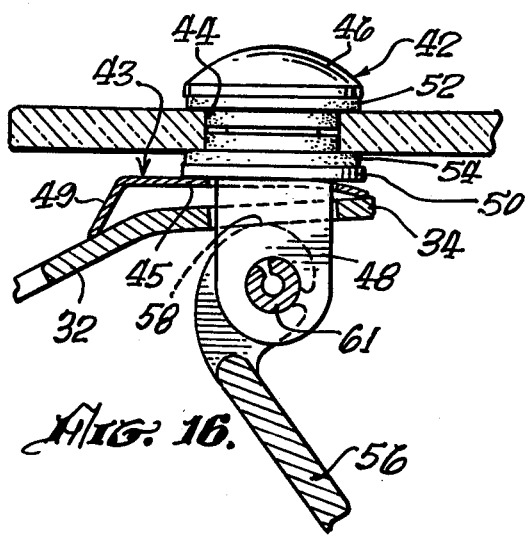
FIG. 16 is a sectional view similar to FIG. 4, showing the tongue in a free position, but under tension to prevent free motion of the tongue.
Figure 17:
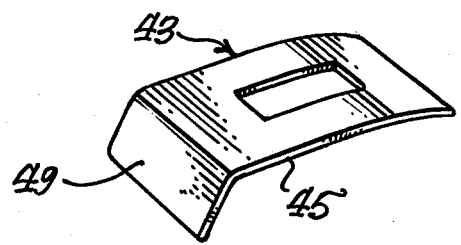
FIG. 17 is a perspective of the leaf spring.

Another form of a stop means is shown in FIGS. 15 and 16, wherein stop means (generally indicated at 43) is shown as comprising a leaf spring 45 having an opening 47 to conform to the shape of lug member 48, so as to readily allow lug 48 to pass therethrough. Leaf spring 45 has a bowed, elongated section and a forward, bent section 49, as seen in FIG. 16. Together, the sections provide a downward tension on tongue 32, thus holding the tongue in a downwardly and substantially fixed position, whereby the forward free end of tongue 32 is held at its greatest distance from the underside of panel edge 20. Thus, in FIG. 16 the device is shown in a released mode; this mode is necessary to separate tongue 32 from jaw 34, and is also necessary to allow tongue 32 to be reengaged with jaw 34. Once tongue 32 is pivotally connected to jaw 34, clamp arm 56 is closed, causing cam-head member 58 to engage section 34 of arm 56. At this time, leaf spring 45 is substantially flattened between section 34 and flange 50. Hence, a continuous biasing load is applied to clamp arm 56.

ALTERNATIVE EMBODIMENT

Referring now to FIGS. 7 through 10, there is shown a panel 16, as previously described, having a similar fastening means 42 comprising a nut head 46 with threaded bore 47, and including a threaded stub member 70. In this particular arrangement, eyelet lug 72 is threaded into bore 47 of head 46 but does not include a flange member. In place thereof, there is provided a locking ring member 74 having a lower projecting boss member 76 having oppositely disposed flat sides 78 so as to be received in elongated aperture 36. Locking ring 74 is threaded to be received on the threaded stud end 70 of head 46, and is tightened against washer 54 — thus securing fastening means 42 to panel 16.

Clamp arm 56 is identical to that as previously described and is connected to lug 72 by pin 78, wherein the cam head engages tongue 32 and clamps it against locking ring 74 (as seen in FIGS. 7 and 9), and releases tongue 32 as shown in FIG. 8.

Referring now to the embodiment found in FIG. 11, there is shown panel 16 having nut-head member 46 mounted in the panel by means of a threaded lug member 80 secured to nut head 46 having washers 52 and 54 interposed therebetween. That is, lug 80 includes an annular flange member 82 having a depending projecting boss 84, the boss being adapted with flat sides 86 to fit within the elongated aperture 36 of tongue 32. A threadable handle 88 is mounted to lug 80, and is prevented from being separated therefrom by a stop member 89 affixed to the free end of the lug. Interposed between the extended body portion 90 of handle 88 is a bellville spring washer 92. When the handle is rotated in one direction, its upper surface 94 forces spring washer 92 against tongue 32, thus clamping it in a stationary locked position. Hence, as the handle is rotated in an opposite direction, the force is released — allowing tongue 32 to fall freely so as to be easily disconnected from jaw member 34 of frame structure 16.

In FIGS. 12 through 14, another embodiment of a quick-release-hinge device is shown mounted to panel 16, wherein the fastener means comprises a bolt member 100 (including a threaded stud 102) to which lock ring 104 is threaded thereon, acting as a nut to fasten bolt 100 to panel 16. Locking ring 104 includes a downwardly projecting boss 105 having flat sides to receive tongue 32, as previously described hereinbefore.

The clamp means used in this embodiment comprises a knob 106 which is mounted to stud 102 so as to freely rotate thereon. The upper portion of knob 106 is arranged to directly engage tongue member 32, as seen in FIG. 12. The engaging force of knob 106 against tongue 32 is caused by a pair of depending cam members 110 formed on the bottom of knob 106. Thus, as the knob is rotated in either direction, cam ears 112 formed on cam-keeper-head member 114 engage inclined cam surfaces 116 of cam members 110 whereby knob 106 is pressed upwardly against tongue 32, thus locking it in a stationary mode. To prevent accidental movement of knob 106, cam members 110 also are provided with detents 118 in which cam ears 112 are received.

When tongue 32 is to e released and is free to move, knob 106 is rotated to cause cam ears 112 to separate from detents 118, thus allowing knob 106 to be lowered as shown in FIG. 13.

The invention and its attendant advantages will be understood from the foregoing description; and it will be apparent that various changes may be made in the form, construction and arrangement of the parts of the invention, without departing from the spirit and scope thereof or sacrificing its material advantages, the arrangement hereinbefore described being merely by way of example; and I do not wish to be resticted to the specific form shown or uses mentioned, except as defined in the accompanying claims.

I claim:

1. A quick-release-hinge device arranged to be connected between a fixed-frame structure and a movable-closure member, wherein the frame structure includes a peripheral sealing mold and wherein the hinge device comprises:

a fixed-hinge member carried by said frame structure;
    a releasable-hinge member releasably mounted to said closure member and releasably attached to said fixed-hinge member;

fastener means mounted to said closure member to support said releasable-hinge member in both a stationary and a movable position;

means for releasably clamping said releasable-hinge member in a locked stationary position relative to said closure member; and stop means mounted on said releasable-hinge member whereby said hinge member is restricted in its movement when in a movable position.

2. A quick-release-hinge device as recited in claim 1, wherein said releasable-clamping means comprises:

a movable-handle member operably connected to said fastener means;

a cam means formed on said handle member, causing said handle to engage said releasable-hinge member; and connecting means connecting said movable-handle member to said fastener means.

3. A quick-release-hinge device as recited in claim 2, wherein said movable handle comprises an elongated-arm member having one end thereof rotatably attached to said connecting means; and wherein said cam means comprises at least one cam head positioned adjacent said releasable-hinge member, whereby said releasable-hinge member can be released from a fixed position to a floating position so as to be disconnected from said fixed-hinge member carried by said frame structure, thereby permitting said closure member to be removed from said frame structure.

4. A quick-release-hinge device as recited in claim 1, wherein said releasable hinge member comprises an elongated tongue member having disposed at one end thereof an elongated aperture arranged to be supported in a nonrotatable manner on said fastener means, and including a transversely arranged slot disposed in the end opposite said elongated aperture; and wherein said fixed hinge member comprises a jaw member adapted to be removably received in said transverse slot of said tongue member.

5. A quick-release-hinge device as recited in claim 4, wherein said releasable clamping means comprises:

a movable elongated arm member having a free end, the opposite end thereof being rotatably attached to said fastener means; and a cam head formed on the attached end of said elongated arm member for engagement with said tongue member, whereby said tongue member is releasably locked into a stationary position relative to said closure member, in order to permit said closure member to pivot about said hinge members.

6. A quick-release-hinge device as recited in claim 5, wherein said fastener means comprises:

a nut-head member supported in said closure means;

a connecting means carried by said nut-head member; and means for securing said nut head to said closure means.

7. A quick-release-hinge device as recited in claim 6, wherein said connecting means comprises:

a depending eyelet lug having a bore disposed therein; and a pin member received in said bore of said eyelet to operably connect said arm member to said eyelet lug.

8. A quick-release-hinge device as recited in claim 7, wherein said fastener means includes a ring member disposed between said closure member and said releasable arm member.

9. A quick-release hing device as recited in claim 8, wherein said ring member comprises an annular nut having a depending boss adapted to be received in said elongated opening of said tongue member.

10. A quick-release-hinge device as recited in claim 2, wherein said cam means comprises:

a pair of depending cam members having centrally located detents formed therein; and a keeper head secured to said fastener means;

said keeper head including a pair of cam ear members arranged to engage said depending cam members and be removably received in said detents, whereby said handle is releasably engaged with said releasable hinge member.

11. A quick-release-hinge device as recited in claim 2, wherein said cam means comprises a bellville washer interposed between said handle and said releasable-hinge member; and wherein said connecting means comprises a threaded lug member having a stop member affixed thereto for preventing said handle from being separated from said lug member.

12. A quick-release-hinge device as recited in claim 2, wherein said stop means comprises a resilient-bumper member affixed to said releasable-hinge member so as to engage said movable-closure member, limiting the upward movement of said releasable-hinge memeber.

13. A quick-release-hinge device as recited in claim 2, wherein said stop means comprises a flexible, leaf-spring member mounted on said releasable hinge member to provide a downward tension on said hinge member so as to control the upward movement of said hinge member.

* * * * *